United States Patent
Wang et al.

(10) Patent No.: US 9,109,504 B2
(45) Date of Patent: Aug. 18, 2015

(54) WASTEGATE VALVE CONTROL FOR DEGRADED MEASUREMENT

(71) Applicant: Ford Global Technologies, LLC, Dearborn, MI (US)

(72) Inventors: Yan Wang, Ann Arbor, MI (US); Hamza Derbas, Boston, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 14/010,987

(22) Filed: Aug. 27, 2013

(65) Prior Publication Data

US 2015/0059337 A1 Mar. 5, 2015

(51) Int. Cl.
*F02D 23/00* (2006.01)
*F02B 37/18* (2006.01)

(52) U.S. Cl.
CPC .................................... *F02B 37/186* (2013.01)

(58) Field of Classification Search
CPC .................................................... F02B 37/186
USPC ............... 60/39.6–39.63, 597–624; 123/559.1–566, 200–249
See application file for complete search history.

(56) References Cited

U.S. PATENT DOCUMENTS

| | | | |
|---|---|---|---|
| 4,748,567 A * | 5/1988 | Sumizawa et al. ............ 701/114 |
| 5,816,047 A * | 10/1998 | Zurlo ............................ 60/602 |
| 6,687,601 B2 * | 2/2004 | Bale et al. .................... 701/108 |
| 6,804,601 B2 * | 10/2004 | Wang et al. ................... 701/107 |
| 7,458,249 B2 * | 12/2008 | Kassner ....................... 73/35.06 |
| 8,347,625 B2 | 1/2013 | Baeuerle |
| 8,397,499 B2 | 3/2013 | Doering et al. |
| 2002/0129799 A1 * | 9/2002 | Wang et al. .............. 123/568.16 |
| 2014/0338307 A1 * | 11/2014 | Kokotovic et al. ............. 60/273 |
| 2014/0360178 A1 * | 12/2014 | Wang ............................ 60/602 |

* cited by examiner

*Primary Examiner* — Jesse Bogue

(74) *Attorney, Agent, or Firm* — Julia Voutyras; Alleman Hall McCoy Russell & Tuttle LLP

(57) ABSTRACT

Various systems and methods are provided for controlling a wastegate in the presence of a degraded wastegate valve sensor. In one example, responsive to feedback from a wastegate valve sensor being unavailable, a wastegate valve is moved to an at least partially open position in part via exhaust pressures responsive to a desired boost being within a first range. Responsive to feedback from the wastegate valve sensor being unavailable, the wastegate valve is moved toward a fully closed position at a rate responsive to boost pressure dynamics responsive to the desired boost being within a second, different range.

20 Claims, 7 Drawing Sheets

| DESIRED BOOST | ACTION |
|---|---|
| SECOND RANGE | DETERMINE TIME CONSTANT VIA DEGRADED CLOSED LOOP CONTROL AND INCREASE BOOST BASED ON DETERMINED TIME CONSTANT |
| FIRST RANGE | OPEN WASTEGATE VALVE VIA SHORT CURRENT PULSE AND MAINTAIN WASTEGATE VALVE IN AT LEAST PARTIALLY OPEN POSITION VIA EXHAUST PRESSURES |

FIG. 6

WASTEGATE VALVE CONTROL FOR DEGRADED MEASUREMENT

FIELD

The disclosure relates to a control of a wastegate valve in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side and the compressor is coupled to an intake manifold side of an engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. A wastegate valve may be controlled based on operating conditions to achieve the desired boost. A sensor indicating the state of the wastegate may be provided, such as a position sensor indicating the position of the wastegate valve. In some examples, the wastegate valve is actuated pneumatically, while in other examples the wastegate valve is actuated electronically, for example by an electric motor.

U.S. Pat. No. 8,397,499 describes a system for controlling a turbocharged engine. The responsiveness of boost control is increased by adjusting both an intake throttle and a wastegate of a turbocharger to control boost levels supplied to the engine. The control system utilizes a plurality of feedback and feed-forward mechanisms to reduce error, including measurements of throttle inlet pressure (TIP) to account for disturbances caused by movement the intake throttle and to separate these disturbances from other effects.

In other approaches, wastegate control systems utilize both inner and outer loop control to facilitate positioning of a wastegate valve and thus provide desired boost levels to an engine. The outer loop control may implement desired boost levels, while the inner loop control may include a closed-loop control mechanism which provides faster wastegate control dynamics by controlling the wastegate valve (e.g., wastegate valve position) by issuing commands to a wastegate valve actuator.

The inventors herein have recognized an issue with such approaches. When operation of a sensor indicating the state (e.g., position) of an associated wastegate valve becomes degraded, feedback available for the inner loop control mechanism is no longer available. Thus, accurate boost levels may not delivered to an engine. Although the wastegate valve may be held at an at least partially open position to protect engine components from damage, sufficient boost levels cannot be delivered to the engine at certain load ranges.

Systems and methods for controlling a wastegate in the presence of a degraded wastegate valve state sensor.

In one example, responsive to feedback from a wastegate valve sensor being unavailable, a wastegate valve is moved to an at least partially open position in part via exhaust pressures responsive to a desired boost being within a first range. Responsive to feedback from the wastegate valve sensor being unavailable, the wastegate valve is moved toward a fully closed position at a rate responsive to boost pressure dynamics responsive to the desired boost being within a second, different range.

In this way, sufficient boost may be provided to an engine when feedback from a wastegate valve sensor is unavailable. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table illustrating wastegate control in the presence of a degraded wastegate valve sensor.

DETAILED DESCRIPTION

Compression devices such as a turbocharger may be used to increase the output of an internal combustion engine. A wastegate may in part regulate the boost pressure supplied to the engine by positioning a wastegate valve to thereby control the amount of exhaust gas reaching a turbine of the turbocharger. Failure of a sensor tracking the position of the wastegate valve, however, may prevent accurate positioning of the wastegate valve and thus accurate supply of boost to the engine. In some approaches, inner loop control is provided to position the wastegate valve. In the event of degradation of the wastegate valve sensor (e.g., position sensor), the wastegate valve may be positioned at an at least partially open position to protect the engine from damage, but as a result sufficient boost levels cannot be delivered to the engine for certain load ranges.

Figure 1:
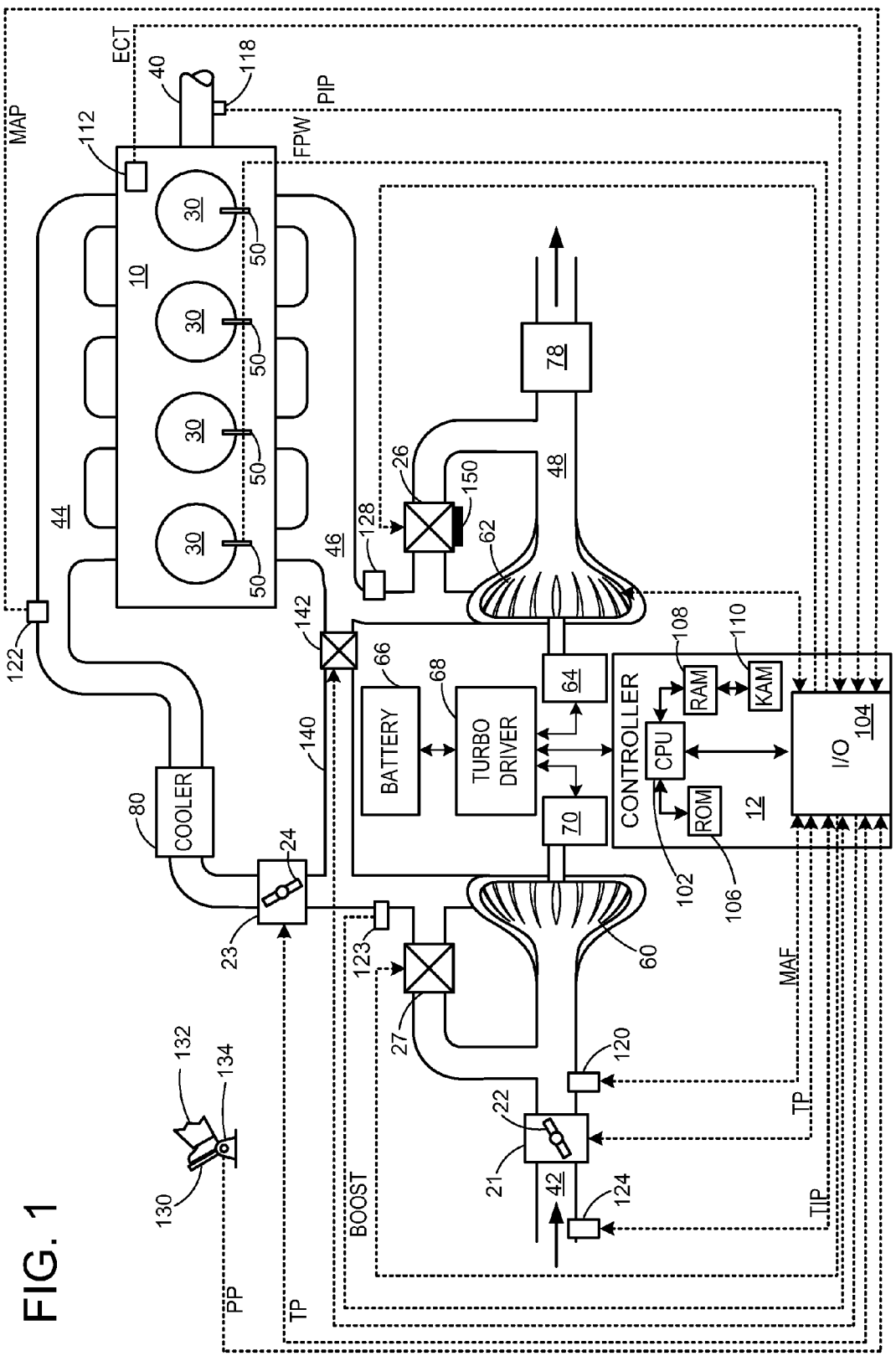
FIG. 1 shows a block diagram of a turbocharged engine including a wastegate.
Figure 2:
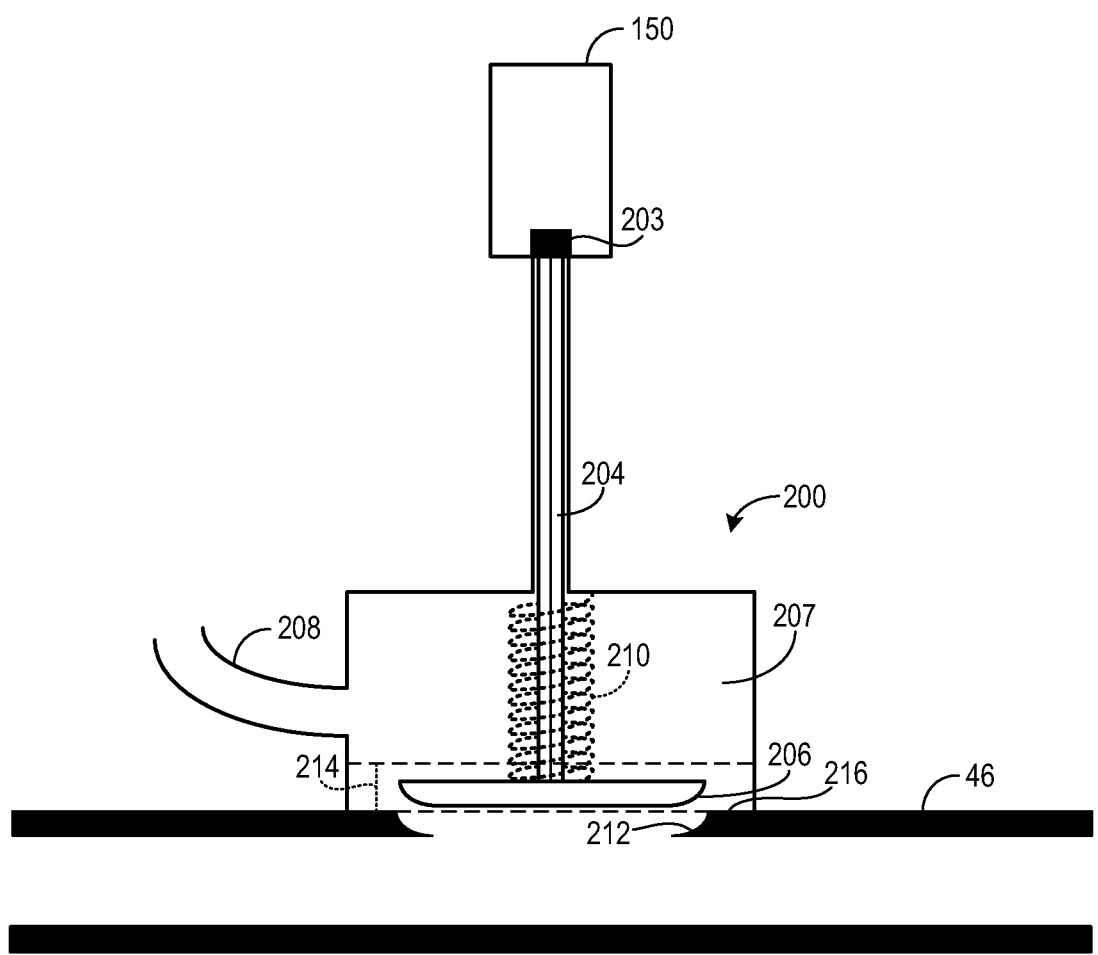
FIG. 2 shows an example of an electric wastegate in accordance with an embodiment of the present disclosure.
Figure 3:
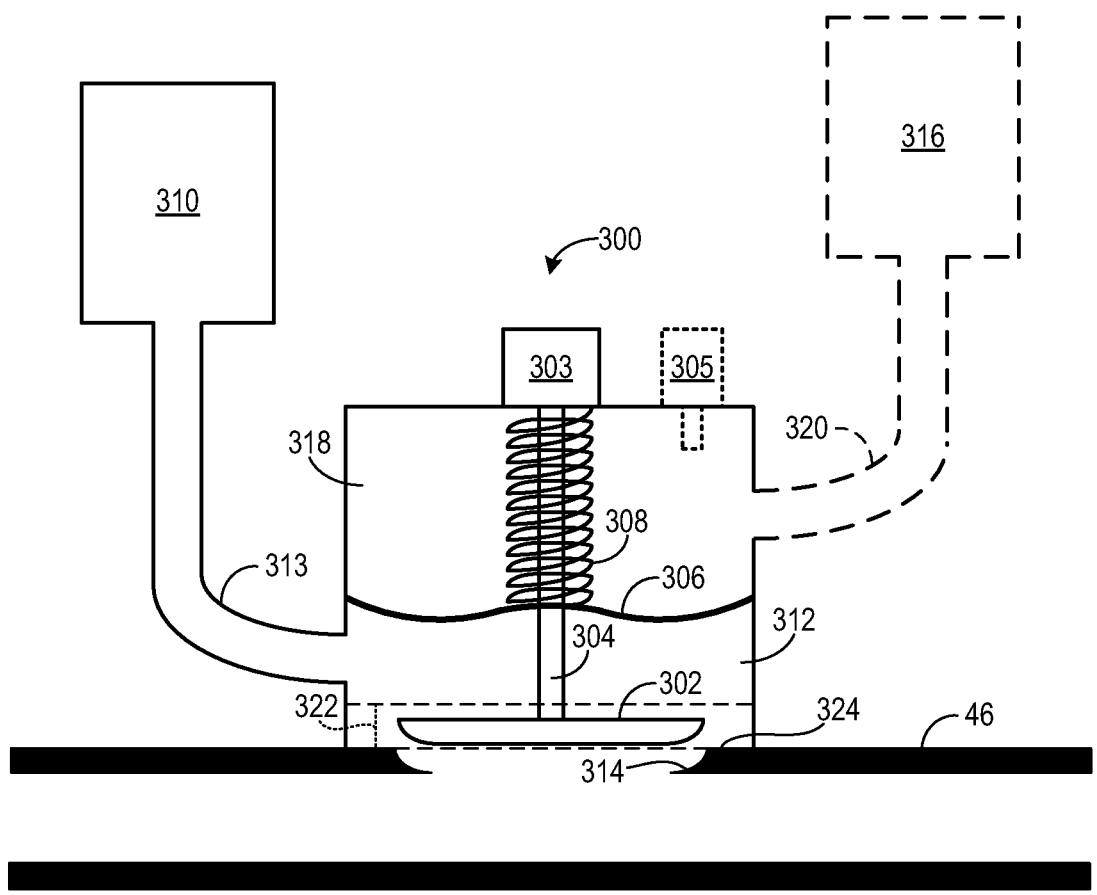
FIG. 3 shows an example of a pneumatic wastegate in accordance with an embodiment of the present disclosure.
Figure 4:
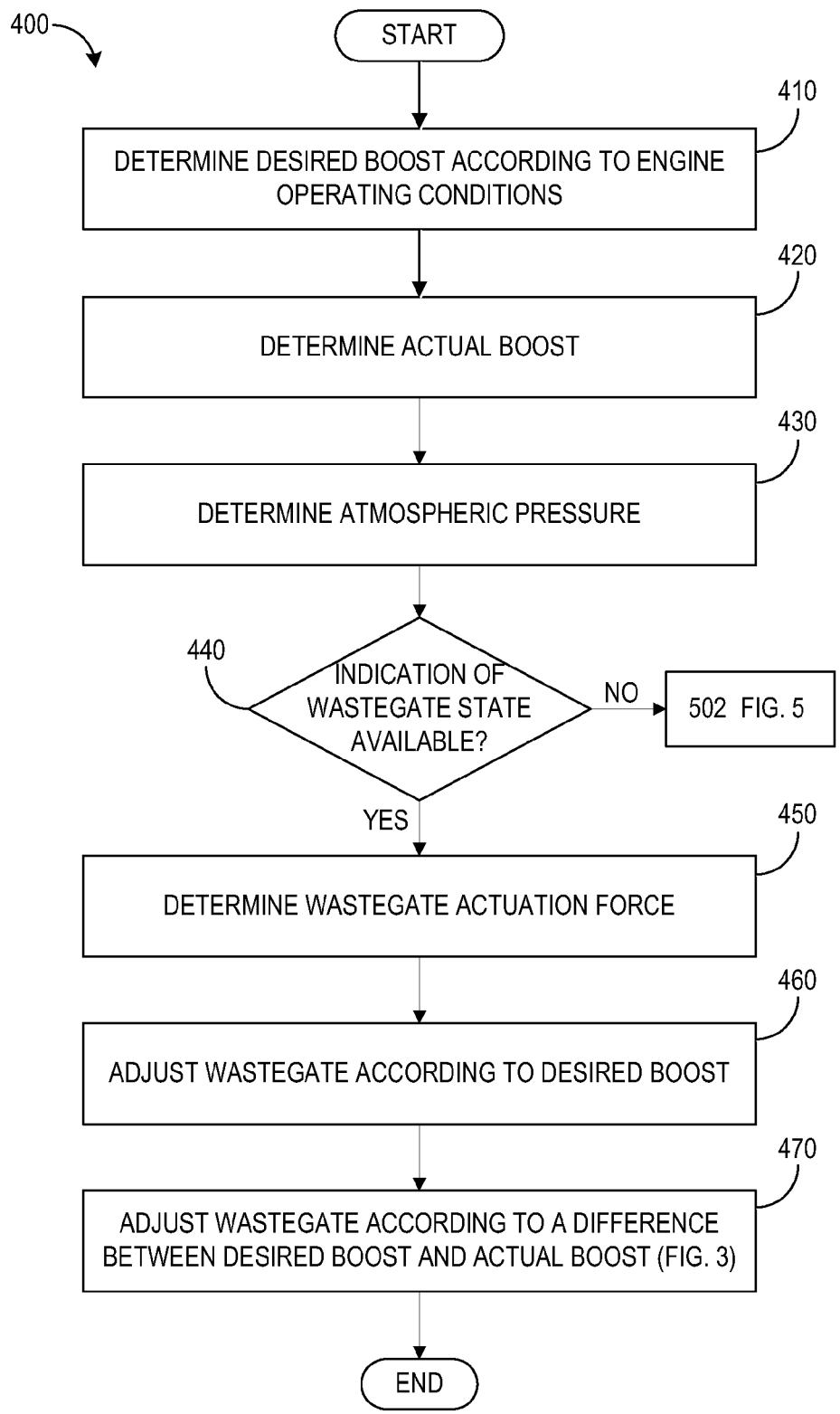
FIG. 4 shows a flowchart illustrating a method for controlling a turbocharger via the wastegate of FIG. 2 or 3.
Figure 5:
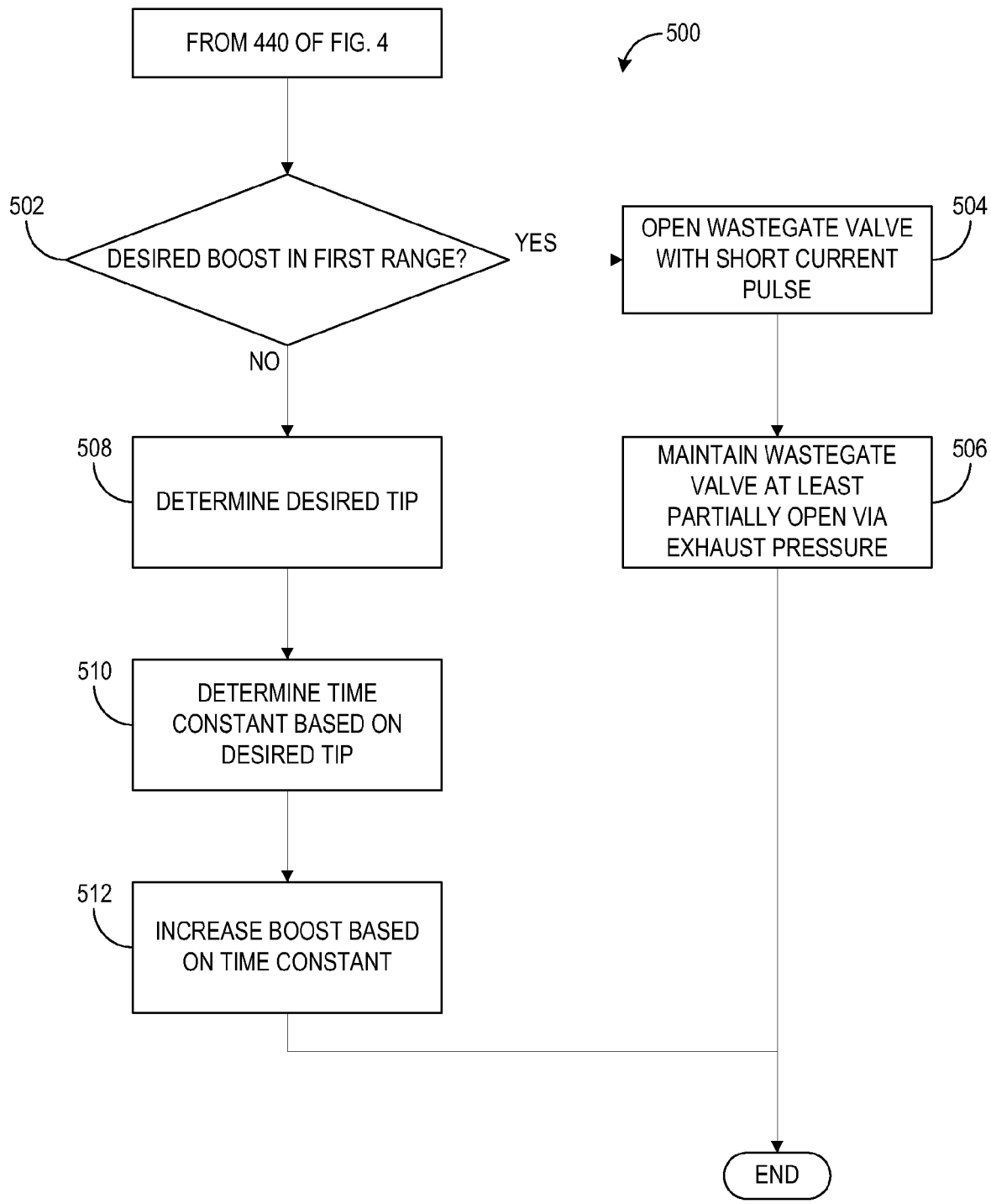
FIG. 5 shows a flowchart illustrating a method for controlling the wastegate of FIG. 2 or 3 in the presence of a degraded wastegate valve sensor.
Figure 7:
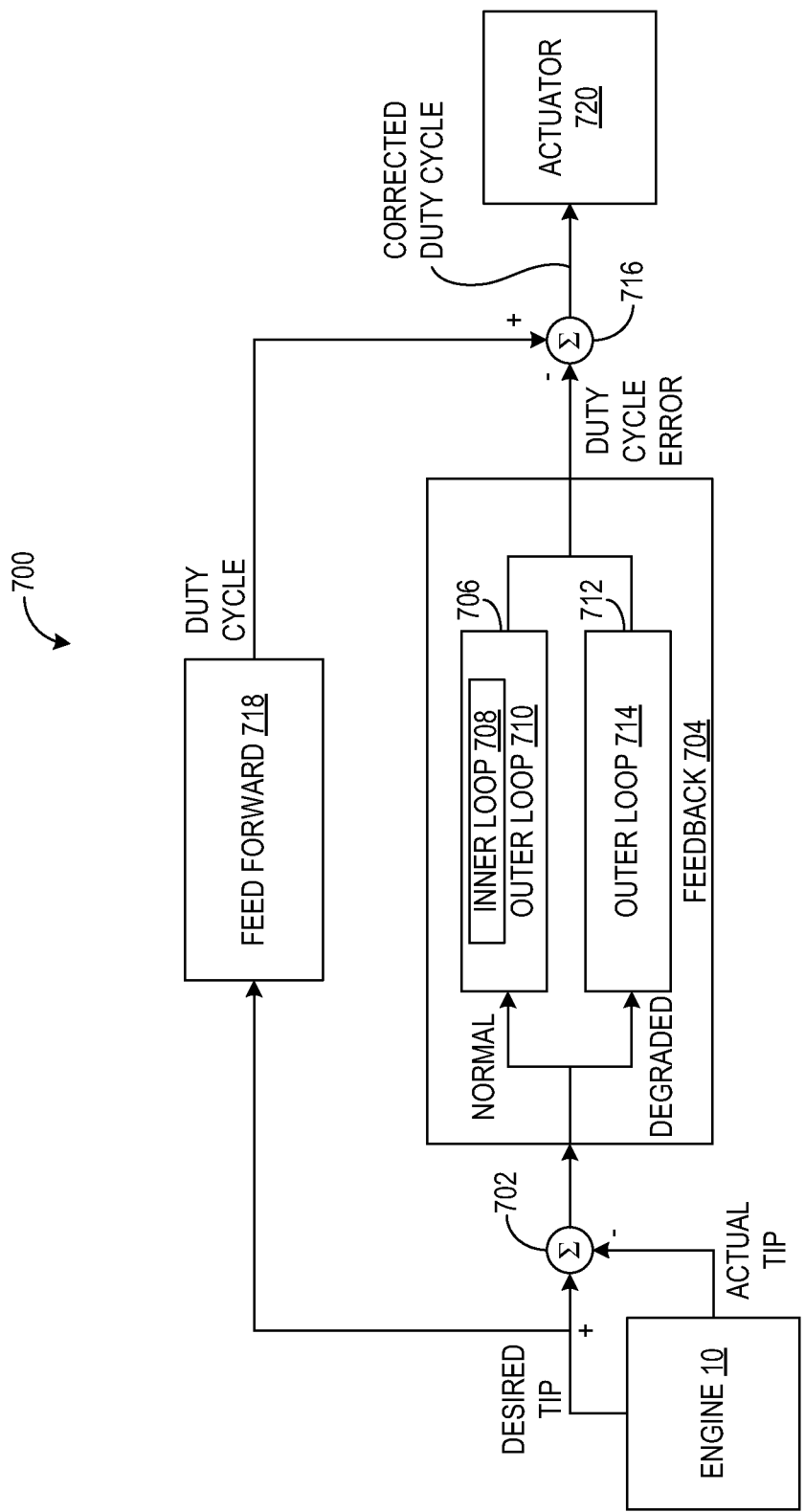
FIG. 7 schematically shows an example of a control system by which the wastegates of FIGS. 2 and 3 may be controlled.

Various systems and methods are provided for controlling a wastegate in the presence of a degraded wastegate valve sensor. In one example, responsive to feedback from a wastegate valve sensor being unavailable, a wastegate valve is moved to an at least partially open position in part via exhaust pressures responsive to a desired boost being within a first range. Responsive to feedback from the wastegate valve sensor being unavailable, the wastegate valve is moved toward a fully closed position at a rate responsive to boost pressure dynamics responsive to the desired boost being within a second, different range. FIG. 1 is a block diagram of a turbocharged engine including a wastegate. FIG. 2 shows an example of an electric wastegate in accordance with an embodiment of the present disclosure. FIG. 3 shows an example of a pneumatic wastegate in accordance with an embodiment of the present disclosure. FIG. 4 shows a flowchart illustrating a method for controlling a turbocharger via the wastegate of FIG. 2 or 3. FIG. 5 shows a flowchart illustrating a method for controlling the wastegate of FIG. 2 or 3 in the presence of a degraded wastegate valve sensor. FIG. 6 shows a table illustrating wastegate control in the presence of a degraded wastegate valve sensor. FIG. 7 schematically shows an example of a control system by which the wastegates of FIGS. 2 and 3 may be controlled. The engine of FIG. 1 also includes a controller configured to carry out the methods depicted in FIGS. 4 and 5.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 124 for providing respective signals MAF (mass airflow) MAP (manifold air pressure), and TIP (throttle inlet pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; throttle inlet pressure (TIP) from throttle inlet pressure sensor 124 positioned upstream of inlet throttle 21; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric or a pneumatic actuator, for example. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an example of a wastegate 200, which may be wastegate 26 of FIG. 1, is shown. Wastegate 200 is included along a portion of exhaust manifold 46 shown in FIG. 1. In the illustrated embodiment, wastegate 200 is an electric wastegate and is driven by actuator 150, which in this example is a solenoid, though various suitable devices may be used to drive the wastegate. Actuator 150 transmits a driving force via a linkage 204 (e.g., a cylindrical rod) to a wastegate valve 206, which may transition between a fully closed position and a fully open position, and may settle at any position therebetween. The position of wastegate valve 206 may thus be continuously variable, and may be monitored via a position sensor 203 configured to send signals to an engine controller such as controller 12 of FIG. 1. It will be appreciated, however, that the state of wastegate valve 206 may be tracked in other manners, for example by other types of sensors or soft models.

As wastegate valve 206 is opened from the fully closed position, an opening may be created through which gasses flowing through exhaust manifold 46 may flow into a chamber 207. From chamber 207, gasses may flow to a vent 208 which may receive and exhaust gas from exhaust manifold 46 when wastegate valve 206 is not in the fully closed position. Thus, the amount of boost supplied to an engine may be controlled by driving wastegate valve 206 via actuator 150, thereby altering the position of wastegate valve 206 and the amount of gas reaching an intake manifold and a turbine of a turbocharger (e.g., turbine 62 in FIG. 1). In one example, the valve 206 may be formed via a pintle, with a surface area facing the flow through manifold 202. The pressure difference across the pintle may generate forces acting to move the pintle. Although not shown, wastegate 200 may include a motor and a gear box, with linkage 204 extending from an output shaft of the gear box to wastegate valve 206. In some embodiments position sensor 203 may measure the orientation of such components, such as the translational position of linkage 204, the rotational orientation of the output shaft or another component inside the motor. In this example, such measurements may be used to indirectly determine the position of wastegate valve 206. Moreover, in other embodiments the position of wastegate valve may be determined based on a soft model using one or more of the signals (e.g., BOOST) described above with reference to FIG. 1 and sent to controller 12.

Wastegate 200 may optionally include a bias 210. Bias 210 is attached at one end to wastegate 200 and to wastegate valve 206 at the other end. In some embodiments, bias 210 is selected to supply a closing force which maintains wastegate valve 206 in a fully closed position up to a threshold pressure. As one non-limiting example, bias 210 may be selected to allow wastegate valve 206 to open for a mean pressure difference across the turbocharger turbine between 0.75 bar and 1 bar. In the event of wastegate degradation, for example due to a loss of power to actuator 150, wastegate valve 206 may be maintained in a fully closed position up to a threshold pressure via the spring pre-load, ensuring that a sufficient buildup of boost is delivered to the engine. Such a configuration may be particularly advantageous in downsized engines, as the extent of downsizing need not be limited to account for the possibility of wastegate actuator degradation. Conversely, at or above the threshold pressure, bias 210 may allow wastegate valve 206 to move toward a fully open position, limiting maximum boost, especially at high loads. Moreover, the size of a wastegate actuator (e.g., actuator 150) and its power consumption may be reduced, as bias 210 supplies additional closing force to wastegate 26. Therefore, during non-degraded operation, the actuator may hold the valve in the fully closed position with a current level that is lower than if the spring pre-load was zero. The current supplied to actuator 150 may be selected to account for the closing force of a bias, such as the spring. In the illustrated embodiment, bias 210 is shown as a spring in a precompressed state, though various suitable structures may be used to supply additional closing force to wastegate 26. In the case where a spring is employed, the spring constant may be selected to supply closing force up to a particular threshold pressure and supply sufficient boost to an engine.

At the fully closed position, wastegate valve 206 comes into contact with a valve seat 212, abutting the valve seat and fluidically sealing wastegate 200 from exhaust passage 46 such that gasses flowing through the exhaust passage do not enter the wastegate. At this position, maximum boost may be provided to engine 10, depending on other conditions such as the positions of throttles 21 and 23 of FIG. 1. FIG. 2 also depicts a low-lift region 214 designating a region in which the separation between wastegate valve 206 and valve seat 212 is considered to be relatively small for the plurality of positions (e.g., lifts) of the wastegate valve in this low-lift region. As used herein, "lift" may equally refer to the separation of a wastegate valve from a corresponding valve seat. Low-lift region 214 may extend from an upper surface 216 of valve seat 212 to any suitably defined point within chamber 207, and may be measured from this upper surface to the upper surface of wastegate valve 206. For example, low-lift region 214 may extend from upper surface 216 of valve seat 212 to a height approximately 20% of the total height of chamber 207. It will be understood, however, that suitable low-lift regions may be predetermined based on the physical characteristics of a wastegate or dynamically determined based on various operating parameters. Wastegate valve 206 may be placed in a location within low-lift region 214 in the event that operation of position sensor 203 degrades, as described in further detail below with reference to FIG. 5.

Turning now to FIG. 3, another example of a wastegate 300 is shown, which may be wastegate 26 of FIG. 1. As with electric wastegate 200 shown in FIG. 2, wastegate 300 is included along a portion of exhaust manifold 46 shown in FIG. 1, and includes a wastegate valve 302 coupled to a linkage 304 (e.g., cylindrical rod). Wastegate 300, however, is a pneumatic wastegate controlled via pressurized fluid. As such, linkage 304 is coupled to a diaphragm 306 which is in turn coupled to a bias 308, which may be bias 210 of FIG. 2 or any other suitable bias. Bias 308 may bias wastegate valve 302 and diaphragm 306 to any suitable position—e.g., at a fully closed position, a fully open position, or anywhere therebetween. A position sensor 303 tracks the position of wastegate valve 302, relaying the tracked position to an engine controller such as controller 12 of FIG. 1. Alternatively or additionally, wastegate 300 may include a pressure sensor 305 to facilitate tracking of the state of the wastegate.

To facilitate pneumatic positioning of wastegate valve 302, a pressurized fluid source 310 provides varying levels of pressurized fluid (e.g., pressurized air) to a first chamber 312 of wastegate 300 via a first duct 313. Pressurized fluid entering first chamber 312 acts against diaphragm 306, adjusting the position of diaphragm 306 and thus wastegate valve 302 with sufficient pressures. When wastegate valve 302 is in a fully closed position (e.g., fully abutted against a valve seat 314 and fluidically sealing gasses flowing through exhaust manifold 46 from first chamber 312), pressurized fluid delivered from pressurized fluid source 310 to the first chamber provides the mechanism by which wastegate valve 302 may begin to open. At other partially open positions, however, pressurized fluid delivered from pressurized fluid source 310 may combine with exhaust gasses entering first chamber 312 from exhaust manifold 46 to position wastegate valve 302. Pressurized fluid source 310 may be, for example, an air compressor or a source of intake air from engine 10 of FIG. 1. Although not shown, pressurized fluid source 310 may include a vacuum regulator and/or one or more valves to control the supply of pressurized fluid to first chamber 312. Likewise, wastegate 300 may optionally include a second pressurized fluid source 316 configured to provide pressurized fluid (e.g., pressurized air) to a second chamber 318 in wastegate 300 via a second duct 320. Pressurized fluid delivered from this source to second chamber 318 may act against diaphragm 306 in a direction opposite that of fluid delivered to first chamber 312. With the inclusion of a vacuum regulator and/or one or more valves in second pressurized fluid source 316 and/or second duct 320, precise positioning of wastegate valve 302 may be achieved via balanced supply of pressurized fluid to both first and second chambers 312 and 318. It will be appreciated that suitable modifications may be made to wastegate 300 without departing from the scope of the disclosure. For example, a vent (not shown) may be provided to further aid in pressure regulation in the wastegate.

FIG. 3 also shows a low-lift region 322 in which the separation between wastegate valve 302 and valve seat 314 is considered to be relatively small for the plurality of positions (e.g., lifts) of the wastegate valve in this low-lift region. As with low-lift region 214 shown in FIG. 2, low-lift region 322 may extend from an upper surface 324 of valve seat 314 to any suitably defined point within first chamber 312, and may be measured from this upper surface to the upper surface of wastegate valve 302. As a non-limiting example, low-lift region 322 may extend from upper surface 324 of valve seat 314 to a height approximately 15% of the sum height of first and second chambers 312 and 318. Low-lift region 322 may be defined as any suitable portion of the sum height of first and second chambers 312 and 318, and may be predetermined based on the physical characteristics of wastegate 300 or determined dynamically based on various desired operating parameters. Wastegate valve 302 may be placed in a location within low-lift region 322 in the event that operation of sensors 302 and/or 303 degrades, as described in further detail below with reference to FIG. 5.

FIG. 4 shows a flowchart illustrating a method 400 which may be executed by an engine controller (e.g., controller 12) for controlling a turbocharger via a wastegate (e.g., wastegates 200 and 300). In one example, a method of controlling a turbocharger of an engine via a wastegate may comprise determining a desired boost pressure and an actual boost pressure. The wastegate may be adjusted according to a difference between the desired boost pressure and the actual boost pressure.

At 410 the method includes determining a desired boost according to engine operating conditions. The conditions assessed may be directly measured with sensors, such as sensors 112, 118, 120, 122, 123, 124, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), throttle inlet pressure (TIP), engine speed, idle speed, barometric pressure, a driver-demanded torque (for example, from a pedal position sensor 134), air temperature, vehicle speed, etc.

Next, at 420, an actual boost pressure may be determined. The actual boost may be directly measured from a sensor, such as sensor 123. The measurement may be sent to controller 12 via the BOOST pressure signal and stored in a computer readable storage medium. In an alternative embodiment, the actual boost pressure may be estimated based on other operating parameters, such as based on MAP and RPM, for example.

Next, at 430, atmospheric pressure may be determined. For example, atmospheric pressure may be measured from the MAP sensor at engine start-up, and/or estimated based on operating conditions of the engine, including MAF, MAP, throttle position, etc. The measurement may be sent to controller 12 and stored in a computer readable storage medium. In an alternative embodiment, the atmospheric pressure may be estimated based on other operating parameters.

Next, at 440, it is determined whether an indication of the state of the wastegate is available. In embodiments in which a position sensor (e.g., position sensor 203) is used to track the position of a wastegate valve of the wastegate, it may be determined whether output from the position sensor is available. In other embodiments in which a pressure sensor (e.g., pressure sensor 305) is used to indicate wastegate state, it may be determined whether output from the pressure sensor is available. If an indication of wastegate state is not available (NO), the method proceeds to 502 of FIG. 5 where the wastegate is controlled via a separate method 500 in a degraded mode, the method described in further detail below. If an indication of wastegate state is available (YES), the method proceeds to 450.

Next, at 450, a wastegate actuation force may be calculated based on a pressure differential across the wastegate, exhaust flow, and/or the angle of the wastegate valve. The wastegate may be adjusted according to the wastegate actuation force. The wastegate actuation force may accurately resemble a pressure differential across the wastegate. For example, the wastegate actuation force may be used as an input to wastegate dynamics. The wastegate dynamics may map a desired wastegate pressure or a desired wastegate valve position to a wastegate duty cycle for a given wastegate actuation force, where the duty cycle signal is generated by the controller and sent to the wastegate actuator to adjust the actuation force. The wastegate actuator may be actuator 150 in wastegate 200, or a vacuum regulator in wastegate 300, for example. Mapping to a wastegate duty cycle may include using lookup tables or calculating the wastegate duty cycle. A wastegate control (WGC) signal may include pulse width modulation via the wastegate duty cycle to adjust the wastegate. The desired wastegate pressure or the desired wastegate valve position may be achieved by feed-forward, feedback, or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Returning to FIG. 4, at 460 the wastegate may be adjusted according to the desired boost. For example, the desired boost pressure may be used as an input to a feed-forward control algorithm for adjusting the wastegate position. The feed-forward control algorithm may process a target wastegate pressure or a target wastegate valve position that may be used as an input to inner control loops.

Finally, at 470, a boost error may be calculated as a difference between the desired boost pressure and the actual boost pressure. The wastegate may be adjusted according to the processed boost pressure error. For example, the boost pressure error may be used as an input to a feedback control algorithm to calculate a target wastegate pressure, if pressure control is desired, or a target wastegate valve position within an inner loop. The control algorithm may include a compensation term as described above.

Turning now to FIG. 5, a method 500 is shown for controlling a wastegate when output from a sensor indicating the position of a wastegate valve is unavailable. Method 500 may be executed in the event that operation of sensors 203, 303 becomes degraded, for example. The method is executed upon determination that an indication of wastegate state is unavailable at 440 of method 400 shown in FIG. 4.

At 502, it is determined whether the desired boost is within a first range. The first range may include a lower end of boost values, extending for example from zero boost (e.g., no desired boost) to a relatively low boost value (e.g., 20% of maximum boost). Such values, and the overall first range, may be adjusted, however, such that the actions performed as part of method 500, respective to the association of the desired boost with a boost range, are appropriate for wastegate operation in the event of sensor degradation or unavailability of wastegate state. If the desired boost is within the first range (YES), the method proceeds to 504.

At 504, the wastegate valve is opened by issuance of a short current pulse to its associated actuator—e.g., actuator 150 for electric wastegate 200, or a vacuum regulator for pneumatic wastegate 300. The duration of the current pulse may be predetermined based on the physical characteristics of the wastegate valve, and may be chosen such that it is sufficient to prompt opening of the wastegate valve (e.g., liftoff from its associated valve seat). As shown at 506, after issuance of the short current pulse, the wastegate valve is maintained at an at least partially open position via exhaust pressure. For example, exhaust gasses flowing through exhaust passage 46 in FIGS. 2 and 3 may act against the lower surfaces of wastegate valves 206 and 302 with forces sufficient to maintain a degree of separation from their respective valve seats 212 and 314. In some scenarios, following issuance of the short current pulse, exhaust pressures may maintain wastegate valves 206 and 302 in low-lift regions 214 and 322, respectively. Placing the wastegate valve in an at least partially open position via the actions performed at 504 and 506 may protect an associated engine from damage to due excessive supply of boost. Following 506, the method ends.

If, at 502, it is determined that the desired boost is not within the first range (NO), the method proceeds to 508. Here, the wastegate is operated differently according to the association of the desired boost with a different range in the event of feedback unavailability from a sensor. In the example described above, alternate wastegate control is performed if the desired boost exceeds 20% of maximum boost.

At 508, the desired throttle inlet pressure (TIP) is determined. Desired TIP may be determined based on the desired boost determined at 410 of method 400 in FIG. 4, for example, and in some embodiments may be determined therein at 410 as part of determining the desired boost.

Next, at 510, a time constant is determined based on the desired TIP determined at 508. The time constant provides a timescale over which boost increases may be facilitated, and may be related to a gain of a proportional controller in a control system 700, described in further detail below with reference to FIG. 7.

Finally, at 512, boost provided to an associated engine (e.g., engine 10) is increased over a timescale determined by the time constant. Generally, the time constant will be relatively large such that boost is increased relatively gradually. Gradual boost increase may ensure that engine torque and turbocharger speed are not overshot.

In this way, boost control may be provided responsive to feedback from a wastegate valve sensor (e.g., position sensor) being unavailable, and further responsive to desired boost being in a first range or a second range.

It will be appreciated that method 500 may be modified in various suitable manners. For example, in some embodiments it may be instead determined at 502 whether the desired TIP is in a first range of TIP values. The desired TIP may accordingly be determined prior to 502, for example as part of determining the desired boost at 410 of method 400 in FIG. 4. In this example, the wastegate control of method 500 may be carried out according to the desired TIP. In some approaches, a desired TIP may be determined based on a desired boost level, for example by consulting a look-up table.

FIG. 6 shows a table 600 illustrating wastegate control according to the association of desired boost with the first or second range in the event that feedback from a wastegate valve sensor is not available. As described above with reference to method 500 in FIG. 5, if the desired boost is within a first range of boost levels, opening of the wastegate valve is initiated by sending a short current pulse to an actuator operatively coupled to the wastegate valve. The actuator may be, for example, an electric actuator (e.g., actuator 150 operatively coupled to wastegate valve 206) or a pneumatic actuator (e.g., one or more vacuum regulators fluidically controlling the position of wastegate valve 302). The first range of boost levels may extend from zero desired boost to a relatively low level of desired boost (e.g., 20% of maximum boost). Following supply of the short current pulse, the wastegate valve is maintained at an at least partially open position via exhaust pressures flowing through a proximate manifold (e.g., exhaust manifold 46).

If instead the desired boost falls within a second range of boost levels, alternate wastegate control is engaged. Here, boost levels are increased according to a time constant determined via closed loop control specific to degraded wastegate valve position sensing in a control system 700 described in further detail below. The second range of boost levels in this embodiment spans the remaining range of boost levels between the upper limit of the first range of boost levels (e.g., 20% of maximum boost in the above example) and the maximum boost which may be achieved. In some embodiments, the second range of boost levels may include medium and high levels of desired boost, though the first and second range of boost levels may be modified according to various modes of desired operation.

As described above, wastegate control actions specific to the first and second ranges may instead be performed based on a desired TIP and whether the desired TIP falls within an associated first or second range of TIP values. In some examples, desired TIP may be determined by utilizing a look-up table associating desired boost levels with desired TIP values.

Turning now to FIG. 7, a control system 700 is schematically shown with which wastegate control may be performed responsive to operating conditions. Control system 700 may be used to facilitate supply of desired boost via control of wastegates 200 and 300, and may further be used to implement wastegate control in the event of wastegate valve sensor degradation as described above with reference to FIGS. 5 and 6. While shown and described with reference to engine 10 of FIG. 1, control system 700 may be implemented in other suitable engines.

Engine 10 supplies a desired throttle inlet pressure (TIP) and an actual TIP to a first summation block 702. The desired TIP may be determined as described above (e.g., based on operating conditions and/or based on desired boost), while the actual TIP may be determined based on output from a TIP sensor such as sensor 124 shown in FIG. 1. Having determined the difference between the desired TIP and actual TIP at first summation block 702, this difference is supplied to a feedback module 704, which generally serves as a proportional controller in control system 700.

As shown in the illustrated embodiment, feedback module 704 includes control mechanisms which may be employed for scenarios in which a wastegate valve sensor operates normally, and for scenarios in which operation of the sensor has degraded (e.g., feedback from a position sensor is unavailable). A normal control mechanism 706 which may be engaged for normal operation of the sensor (e.g., feedback from a position sensor being available) includes an inner loop 708 and an outer loop 710. Inner loop 708 may receive feedback regarding the position of a wastegate valve from the sensor and generate desired wastegate valve positions in response to the feedback and other operating conditions.

Inner loop 708 thus provides closed-loop control in this example. It will be appreciated, however, that inner loop 708 may generate other suitable commands which may relate to an actuator operatively coupled to a wastegate valve. For example, inner loop 708 may generate desired orientations of rotational components in an electric actuator coupled to a wastegate valve. Outer loop 710 may provide open-loop control by implementing desired TIP levels, or in some embodiments, desired boost levels.

A degraded control mechanism 712 which may be engaged for degraded operation of the sensor includes an outer loop 714, omitting a closed inner loop due to the lack of feedback from the sensor, such that there is no control adjustment of the wastegate based on a desired position and sensor feedback. In some embodiments, degraded control mechanism 712 may be engaged only if feedback from a wastegate valve sensor is unavailable. When the desired boost (or a corresponding desired TIP) is within the first range described above (e.g., extending from zero desired boost to a relatively low percentage of maximum achievable boost), open-loop control may be utilized to initiate opening of the wastegate valve. However, if the desired boost (or corresponding TIP) is within the second range described above (e.g., above the upper limit of the first range), degraded control mechanism 712 may provide closed-loop control by leveraging measurements of actual TIP provided by a TIP sensor such as sensor 124 in FIG. 1. Outer loop 714 differs from outer loop 710 in normal control mechanism 706 by generating selective gains to facilitate the boost increase according the control performed for boost levels in this regime.

Regardless of which of control mechanisms 706 and 712 are engaged, feedback module 704 outputs an error indicative of the difference between the desired and actual TIP in terms of a duty cycle, and may thus, in combination with other components of control system 700, control boost pressure supplied to engine 10. This duty cycle error is provided to a second summation block 716 which also receives a wastegate duty cycle from a feed forward module 718. Feed forward module 718 receives the desired TIP from engine 10 and generates an appropriate wastegate duty cycle, for example via a look-up table. With the duty cycle provided by feed forward module 718, and the duty cycle error provided by feedback module 704, second summation block 716 outputs a corrected duty cycle which is fed to an actuator 720 operatively coupled to the wastegate valve. Actuator 720 may be, for example, actuator 150 operatively coupled to wastegate valve 206 or a vacuum actuator configured to pneumatically actuate wastegate valve 302. In some embodiments, the output of degraded control mechanism 712 may be expressed as $P=K_P*e(t)$, where $K_P$ is the gain, $e(t)$ the error as a function of time (e.g., error between the desired and actual TIP determined at first summation block 702), and P is the output of the degraded control mechanism (e.g., a duty cycle error). As described above with reference to FIGS. 5 and 6, boost increases for desired boosts in the second range of boost values may be performed over a timescale according to a time constant determined based on boost dynamics. This time constant may be based on, and in some examples proportional to, the gain $K_P$. For some scenarios, the gain $K_P$ may be set at a relatively lower value compared to typical gain values due to the relatively faster response of a wastegate actuator (e.g., actuator 150) compared to boost dynamics. More specifically, the time taken to adjust the position of a wastegate valve via an associated actuator may be significantly less than the time taken to reflect a change in boost level supplied to an engine resulting from the wastegate valve position adjustment.

Via execution of the control routines described above, and implementation of control system 700, sufficient boost may be delivered to an engine in the event that feedback from a wastegate valve sensor is unavailable. Excessive supply of boost, and overshooting of engine torque and turbine speed, may further be avoided.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system. It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to feedback from a wastegate valve sensor being unavailable:
moving a wastegate valve to an at least partially open position in part via exhaust pressures responsive to a desired boost being within a first range; and
moving the wastegate valve toward a fully closed position at a rate responsive to boost pressure dynamics responsive to the desired boost being within a second, different range.

2. The method of claim 1,
wherein the wastegate valve is actuated by one of an electric actuator and a pneumatic actuator; and
wherein the wastegate valve sensor is one of a position sensor and a pressure sensor.

3. The method of claim 1, wherein, if the desired boost is within the first range, moving the wastegate valve to the at least partially open position further via supply of a short current pulse to an actuator operatively coupled to the wastegate valve.

4. The method of claim 1,
wherein the first range extends from zero desired boost to a relatively low desired boost; and
wherein the second range extends from the relatively low desired boost to a maximum achievable boost.

5. The method of claim 1, wherein the boost pressure dynamics include a desired throttle inlet pressure.

6. The method of claim 1, wherein the rate is determined based on output of a first outer loop of a feedback controller controlling boost pressure, the first outer loop engaged only if feedback from the wastegate valve sensor is unavailable.

7. The method of claim 6, wherein the output of the first outer loop is based on a gain and an error between a desired throttle inlet pressure and an actual throttle inlet pressure.

8. The method of claim 6, wherein the feedback controller further includes a second outer loop and an inner loop, the second outer loop and the inner loop engaged only if feedback from the wastegate valve sensor is available.

9. The method of claim 6, wherein the feedback controller is configured to output a duty cycle error, the method further comprising:
determining a duty cycle via a feed forward module, the feed forward module configured to generate the duty cycle via a look-up table based on a desired throttle inlet pressure;
determining a corrected duty cycle based on a difference between the duty cycle and the duty cycle error; and
moving the wastegate valve to one of the at least partially open position and toward the fully closed position based on the corrected duty cycle.

10. A system, comprising:
a feedback module including a first outer loop, the first outer loop engaged if feedback from a wastegate valve sensor is unavailable, the feedback module configured to receive a difference between a desired throttle inlet pressure and an actual throttle inlet pressure, the feedback module further configured to output a duty cycle error;
a feed forward module configured to generate a duty cycle based on the desired throttle inlet pressure; and
a summation block configured to generate a corrected duty cycle based on a difference between the duty cycle and the duty cycle error, the corrected duty cycle sent to an actuator operatively coupled to a wastegate valve.

11. The system of claim 10, wherein the feedback module includes a second outer loop and an inner loop, the second outer loop and the inner loop engaged if feedback from the wastegate valve sensor is available.

12. The system of claim 10, wherein the actual throttle inlet pressure is determined based on output from a throttle inlet pressure sensor.

13. The system of claim 10, wherein the corrected duty cycle is operative to:
if a desired boost is within a first range, move the wastegate valve to an at least partially open position; and
if the desired boost is within a second range, move the wastegate valve toward a fully closed position.

14. The system of claim 13, wherein the wastegate valve is moved toward the fully closed position at a rate based on a gain of the first outer loop, the gain based on a difference between the desired throttle inlet pressure and the actual throttle inlet pressure.

15. The system of claim 10, wherein the actuator is one of an electric actuator and a pneumatic actuator.

16. A method, comprising:
  determining a desired boost;
  determining a duty cycle;
  determining a duty cycle error based on a difference between a desired throttle inlet pressure and an actual throttle inlet pressure;
  determining a corrected duty cycle based on a difference between the duty cycle and the duty cycle error; and
  if feedback from a wastegate valve sensor is unavailable:
    if the desired boost is within a first range, maintaining a wastegate valve at an at least partially open position at least via exhaust pressures; and
    if the desired boost is within a second range, moving the wastegate valve toward a fully closed position via the corrected duty cycle.

17. The method of claim 16, wherein the duty cycle error is generated by a proportional feedback controller.

18. The method of claim 17, wherein the proportional feedback controller includes a first outer loop, a second outer loop, and an inner loop, the first outer loop engaged if feedback from the wastegate valve sensor is unavailable, the second outer loop and the inner loop engaged if feedback from the wastegate valve sensor is available.

19. The method of claim 16, further comprising sending the corrected duty cycle to an actuator operatively coupled to the wastegate valve.

20. The method of claim 16, wherein the duty cycle is determined by a feed forward module configured to generate the duty cycle based on the desired throttle inlet pressure via a look-up table.

* * * * *